Jan. 17, 1961 G. C. BROWN 2,968,415
CONTAINER CLOSURES AND LINERS THEREFOR
Filed April 8, 1959
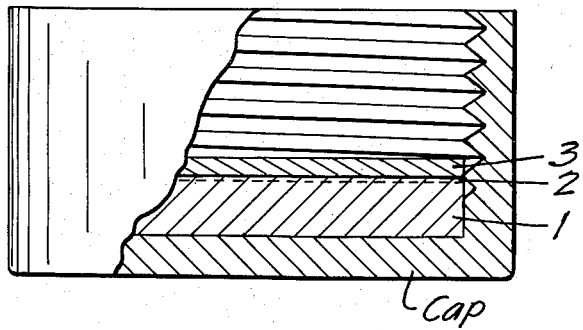
INVENTOR
GORDON C. BROWN
BY
Carpenter, Abbott, Coulter & Kinney
ATTORNEYS

United States Patent Office 2,968,415
Patented Jan. 17, 1961

2,968,415

CONTAINER CLOSURES AND LINERS THEREFOR

Gordon C. Brown, St. Paul, Minn., assignor to Minnesota Mining and Manufacturing Company, St. Paul, Minn., a corporation of Delaware Filed Apr. 8, 1959, Ser. No. 804,951

5 Claims. (Cl. 215—40)

This invention relates to a new and useful container closure. More particularly, this invention relates to a container closure having a novel seal or liner therein.

Many types of container closures with a wide variety of mechanical means for effecting a satisfactory seal are known. Depending on the material being contained, the sealing means in such closures can range from the relatively simple cork bottle cap liner to a more complex, chemically resistant rubber or plastic liner. Since the lips of most bottles or containers have surface irregularities, the closure liner is preferably fabricated, at least in part, of a resilient material which, when placed under compression by the mechanical engagement of the closure, tends to conform to the lip surface and to effect a tight seal. Although suitable liners have been made from discs or rings of resilient plastic, cork, or rubber, the cost both of the materials and of their fabrication has generally been high and the range of application has been limited by the properties of the resilient material used. A satisfactory and less expensive liner has been composed of a coated paper, metal foil or film laminated to an inexpensive resilient backing, such as newsboard or pulpboard. For ease of removal, the face of this combination has then been waxed. However, this product involves from a production standpoint, a multiple operation consisting of coating the paper, laminating the paper to the backing, waxing the face, and slitting to width. The lamination operation necessitates the use of adhesives which, even though particularly selected to resist the effect of certain contained materials, produces an adhesive bond that limits the application and the environment in which the liner can be successfully employed. Thus, delamination frequently occurs as a result of solvent attack, temperature change, etc. Because of the expense of manufacture, and because of the above-mentioned tendency to delaminate in many applications, innumerable attempts have been made to coat directly onto the resilient backing thereby eliminating the laminating step. The results of such direct coating have been notably unsuccessful to date. The high absorptive nature of such inexpensive resilient backing materials as pulpboard and newsboard produced undue penetration of the coating material, thereby increasing material costs and reducing the resiliency of the backing. Densifying the surface of the pulpboard or newsboard by calendering lowers consumption of the coating material somewhat at an appreciable sacrifice in cost and at a further important sacrifice in performance characteristics.

It is therefore an object of this invention to provide a novel container closure having a liner which possesses outstanding seal properties.

It is still another object of this invention to provide a novel container closure which uses an inexpensive resilient coated liner that is readily and simply manufactured.

Various other objects and advantages of the present invention will become apparent to those skilled in the art from the accompanying disclosure and description.

It has now been found that an excellent, inexpensive, yet unlaminated, seal or liner for a container closure can be made from a porous and resilient paperboard, one surface of which contains an organophobic and hydrophobic, non-film-forming material over which has been applied a film-forming composition. This liner, when used as an integral part of a closure or container sealing means, provides an economical container closure which is adaptable to many applications previously requiring the use of more costly and less versatile laminates.

The aforementioned liner consists of a resilient paperboard disc having a basis or area weight of from about 60 to about 175 pounds per 1,000 square feet and a thickness greater than about 0.020 inch, preferably from about 0.02 to about 0.06 inch. The term "paperboard" as employed in this invention includes both pulpboard and newsboard, which constitutes the most preferred embodiments of this invention. Such paperboard may be lined or unlined and is available as newsboard, pulpboard, kraft-lined newsboard, kraft-lined pulpboard, white or blue-white lined pulpboard, etc. The more dense paperboards, such as chipboard, are unsatisfactory because of cost, lack of resiliency and other properties and are therefore not within the scope of the instant invention.

The accompanying figure is a schematic sectional view of the aforesaid container closure liner, showing the paperboard backing 1 having one surface 2 sized with an oleophobic fluorocarbon sizing agent and a surface film-forming layer 3.

The organophobic and hydrophobic material which is contained on one surface of the above described paperboards must be non-film-forming, since retaining the substantial porosity of the backing is essential to permit the surface layer of a film-forming composition to physically bond to the paperboard surface without undue penetration thereof. Although this organophobic and hydrophobic non-film-forming material contained on a single surface of the paperboard disc may be prepared by treating the surface with a number of agents that provide the aforementioned properties, such as certain cyano-substituted silicones, the preferred class of such agents is characterized by having in the molecule one or more highly fluorinated or perfluorinated terminal chains or side chains serving as fluorocarbon "tails." This "tail" is both oleophobic and hydrophobic, in contrast to a hydrocarbon chain, which is oleophilic. The molecule also includes one or more hydrophilic polar groups which serve to solubilize a portion of the molecule and which also serve to bond the molecule to hydrophilic surfaces when the compound is coated on such a surface. A polymeric molecule will, of course, include a large number of such fluorocarbon "tails."

Preferred oleophobic fluorocarbon agents which can be applied to the above-mentioned paperboards are the chromium coordination complexes of fluorocarbon monocarboxylic acids. These acids have a carboxylic acid group at one end of the mo'ecule and a fluorocarbon "tail" at the other end, this "tail" preferably consisting of 5 to 10 fluorinated carbon atoms. These complexes can be prepared by reacting the fluorocarbon acid (e.g., perfluorocaprylic acid $C_7F_{15}COOH$) with chromyl chloride in an isopropanol vehicle which serves both as a solvent and as a reducing agent, a suitable mole ratio being 3 moles of chromyl chloride per mole of fluorocarbon acid. Volatile side products can be removed by distillation. The green-colored isopropanol solution of the chromium complex is diluted with water at time of use to provide a sizing solution containing a few-tenths of a percent or less (e.g., 0.05–0.5 weight percent) of the complex. A neutralizing agent (such as urea) can be included to neutralize HCl that is evolved when the applied fluorocarbon coating is dried and heated to insolubilize and polymerize the chromium complex. Chromium complexes of this type are described in U.S. Patent No. 2,662,835 (December 15, 1953). Other chromium complexes of fluorocarbon acids suitable for use in this invention are set forth in U.S. Serial No. 556,039, filed December 29, 1955. The chromium complex of perfluorocaprylic acid can be employed in minimum effective amounts of about 0.05 to 0.5% by weight in the pulpboard, the amount depending upon the type of paperboard and upon the particular top coating material used as well as the coating conditions.

Another illustration of an effective agent is provided by the polymers of acrylate and methacrylate esters of fluorocarbon alcohols. These alcohols have an alcohol group ($-CH_2OH$) at one end of the molecule and a fluorocarbon "tail" at the other end, this "tail" consisting of three or more fluorinated carbon atoms. The ester monomers can be polymerized in aqueous dispersion to provide an aqueous latex of the polyacrylate or polymethacrylate, which can be diluted with water and used as a paperboard surface treating agent. Fluorocarbon polymers of this type are described in U.S. Patents Nos. 2,642,416 (June 16, 1953) and 2,713,593 (July 19, 1955).

The fluorocarbon compound is applied as a dilute solution in water or in a volatile organic solvent, usually in concentrations of from about 1 to about 10 weight percent, and upon drying provides a thin coating upon the hydrophilic paperboard surface fibers. Due to orientation of the molecules, the coating is tenaciously bonded and the outer surface of the coating has both an hydrophobic and oleophobic characteristic. In treating the relatively porous paperboard of this invention, the individual fibers are coated and rendered highly hydrophobic and oleophobic without materially affecting the essential porosity or resiliency of the paperboard. Capillarity and excessive penetration of the paperboard can thereby be prevented both as to water and oil and as to coating materials such as wax, varnish and synthetic resins.

The paperboard can be conveniently treated by passing between a pair of rotating horizontal squeeze rolls, the lower roll having a resilient rubber covering and being partially immersed in the fluorocarbon solution so as to transfer the latter to the lower side of the paperboard. The wet coating weight can be adjusted by regulating the pressure between the squeeze rolls so as to squeeze out excess solution. Other well-known procedures can be used to apply the solution to one surface of the paperboard, such as by means of a spray, size press, knife coater, air knife, etc. The paperboard is then dried by conventional means, such as using radiant heaters, oven driers, or by passing over one or more steam heat driers in such a manner that the paperboard contacts the heated metal surface.

The top or surface coating composition, which is applied to the oleophobic and hydrophobic side of the paperboard may be selected from any of the well-known film-forming coating materials that can be adhered in liquid form to a paperboard surface to produce a relatively gas or vapor impervious film, depending on the environment in which the container closure is to be used. The particular choice of this surface composition therefore depends primarily on the surface properties desired in the container closure liner. Thus, where a white, glossy surface is desired, a polyvinyl chloride composition may be used whereas selection of a melamine alkyd resin or a fluorocarbon polymer, such as the copolymers of vinylidene fluoride and trifluorochloroethylene, may be preferable where resistance to solvent or chemical attack or to the effects of elevated temperature is needed. Waxes, such as micro-crystalline and paraffin waxes, including both natural and synthetic waxes, may be employed. Synthetic resins and lacquers are particularly desirable for many applications and include such well-known materials as vinyl resins (polyvinyl chloride, etc.), polyamide resins, epoxy resins, nitrocellulose lacquer, melamine alkyd resins, fluorinated and fluorochlorinated rubbers and resins, polyester resins, etc. Although this invention is not limited to a particular class or category of film-forming compound which can be used as the self-sustaining continuous surface coating of the closure liner, the film-former selected must be capable of application in liquid form, e.g., as a melt, solution, dispersion, etc., to the surface of paperboard and of adhering to said surface without the use of additional bonding agents. It is therefore preferable to select a film-forming material which can be applied as a liquid or in a liquid dispersion or solution at temperatures below that at which the paperboard backing tends to char or decompose. In most ordinary applications, the vapor pressure inside a sealed container is higher than that of the surrounding environment outside the container. Thus, to prevent the escape or transmission of vapor through the closure seal or liner and out of the container, the surface coating should be relatively gas and vapor impervious, i.e., the moisture-vapor transmission value of the continuous surface coating should be not more than 15 grams per 100 square inches per 24 hours at 100° F. and 85% relative humidity differential, as measured by TAPPI method T464m–45. For use of a liner or seal in a container closure, it is also desirable that the top or surface coating should resist embrittlement, particularly when the closure is repeatedly removed and reapplied to the container. Application of this top coating to the fluorocarbon treated paperboard backing can be accomplished by conventional means, as by spraying, dip coating, bar coating (e.g., Meyer bar or wire wound bar), roll coating, etc., and dried, as by passing through an oven or over heated rolls. It is to be understood that the top or surface film-forming coating may consist of a single or multiple layers of a single film-forming composition and that, where multiple layers are employed, all layers need not consist of the same film-forming composition. If desired, various fillers, pigments, and dyes may be incorporated into these film-forming compositions.

The liners or seals of this invention are prepared by stamping or cutting discs from strips or sheets of the above-described liner materials. They may be inserted into a cap, such as a screw cap or crown cap, by hand or mechanical means and may be retained therein by force fitting or adhering with a suitable adhesive, thereby forming an integrated sealing container closure.

When the paperboards of this invention are coated with the above-described film-forming compositions, such as an oleoresinous varnish or polyvinyl chloride dispersion, without first providing on the paperboard surface an oleophobic and hydrophobic non-film-forming material, the coating composition penetrates into the interstices of the paperboard fibers, resulting in a product which tends to lack resiliency, which embrittles or cracks and which requires a large consumption of coating composition per unit area. Due to the absorption of the coating composition, multiple coats are frequently necessary, thereby additionally complicating the processing steps. It has also been found that penetration of the top coating composition into the paperboard causes a darkening of the surface color, which is objectionable to many users of container closures. When, in the alternative, the top coating composition is thickened or made more viscous to avoid undue penetration, the adhesion of the top coat to the paperboard backing is generally unacceptable, often resulting in the stripping of the top coat from the backing when the closure is removed from the container. When the container closures of this invention, using the liners herein described, are employed, the above recited disadvantages are obviated.

In a specific example, a sheet of kraft-lined newsboard, having a thickness of 0.040 inch and an area weight of between 0.992 and 1.20 lbs. per square yard, was treated with a solution of a chromium complex made by reacting chromyl chloride and perfluorocaprylic acid in 3 to 1 mol ratio (FC-804 as supplied by Minnesota Mining and Manufacturing Company). The treating composition, containing 96 lbs. of water, 7½ lbs. of FC-804, and 7½ lbs. of urea, was applied to the kraft-lined newsboard by means of a flush-roll coater, after which the sized board was dried at a temperature of about 230° F. Thereafter, the sized newsboard was coated on the reverse roll coater with the following film-forming composition:

33.7% China-wood oil
6.8% Bakelite resin 254 [1]
17.9% Cumar resin V-2 [2]
.1% cobalt naphthenate
.2% manganese naphthenate
41.3% mineral spirits

[1] Bakelite resin 254 is a pure phenolic resin, USDA rosin standard color X or lighter, ring and ball melting point 185-250° F., acid number 85-105, supplied by Union Carbide & Carbon Company.
[2] Cumar resin VE-2 is a para-cumarone-indene resin in the melting range of 127-137° C., supplied by The Barrett Division of Allied Chemical Corporation.

The above materials are cooked and blended according to the customary varnish-making procedures. After the above film-forming composition was coated onto the newsboard, it was fixed on the surface by heating in an oven at about 300° F. It was found that the concentration of FC-804 on the newsboard, which resulted in essentially no penetration and yet permitted good adhesion of the top coating, was about 0.2 weight percent FC-804 solids. When discs are stamped from this material and inserted into screw-type bottle caps, excellent results are obtained when such integrated caps are used under actual service conditions.

Because of the variance in surface roughness of paperboard supplied by the various manufacturers, it may be desirable, where the surface is unusually rough or fuzzy, to add a known lint-laying material to the treating composition containing the non-film-forming oleophobic fluorocarbon compound.

It is to be understood that this invention might be modified in many details without departing from the spirit thereof. There is no intention of limitation to the exact details shown and described.

I claim:

1. In a container closure which comprises a cap having a sealing liner therein, the improvement which comprises a liner consisting essentially of a disc of paperboard having a basic weight of from about 60 to about 175 pounds per 1,000 square feet and a thickness greater than about 0.02 inch, the sealing surface of which contains an organophobic and hydrophobic non-film-forming compound having a fluorocarbon "tail" and a coating of a film-forming material capable of being applied to said sealing surface in liquid form and of producing thereon a self-sustaining, substantially vapor impervious coating.

2. The container closure of claim 1 in which said paperboard is a newsboard.

3. The container closure of claim 1 in which said paperboard is a pulpboard.

4. In a container closure which comprises a cap having a liner therein, the improvement which comprises a sealing liner consisting essentially of a resilient paperboard disc, the sealing surface of which contains an organophobic and hydrophobic non-film-forming compound having a fluorocarbon "tail," and a coating of a film-forming material capable of being applied to said sealing surface in liquid form and of producing thereon a self-sustaining, substantially vapor impervious coating.

5. The container closure of claim 4 in which said organophobic and hydrophobic non-film-forming compound is a chromium coordination complex of a fluorocarbon monocarboxylic acid having from 5 to 10 fluorinated carbon atoms in the molecule forming a fluorocarbon "tail."

References Cited in the file of this patent

UNITED STATES PATENTS

| | | |
|---|---|---|
| 2,331,728 | Raynolds et al. | Oct. 12, 1943 |
| 2,413,453 | Kesler et al. | Dec. 31, 1946 |
| 2,602,559 | Dryer | July 8, 1952 |
| 2,718,323 | Kennedy | Sept. 20, 1955 |
| 2,732,370 | Codding | Jan. 24, 1956 |
| 2,782,184 | Husted et al. | Feb. 19, 1957 |